US009195479B2

(12) United States Patent
Queru

(10) Patent No.: US 9,195,479 B2
(45) Date of Patent: Nov. 24, 2015

(54) SELECTIVE NOTIFICATION OF NATIVE APPLICATIONS

(75) Inventor: Jean Baptiste Maurice Queru, Foster City, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/490,123

(22) Filed: Jun. 6, 2012

(65) Prior Publication Data

US 2013/0097596 A1 Apr. 18, 2013

Related U.S. Application Data

(60) Provisional application No. 61/547,810, filed on Oct. 17, 2011.

(51) Int. Cl.
*G06F 9/445* (2006.01)
*H04L 29/08* (2006.01)

(52) U.S. Cl.
CPC .............. *G06F 9/44526* (2013.01); *G06F 8/61* (2013.01); *H04L 67/34* (2013.01)

(58) Field of Classification Search
CPC ........ G06F 9/44526; G06F 8/61; H04L 67/34
See application file for complete search history.

(56) References Cited

U.S. PATENT DOCUMENTS

| 8,392,912 | B2* | 3/2013 | Davis ................. H04L 63/0227 717/172 |
| 8,418,168 | B2* | 4/2013 | Tyhurst ..................... G06F 8/65 717/168 |
| 8,667,487 | B1* | 3/2014 | Boodman ............... G06F 21/53 717/101 |
| 8,966,628 | B2* | 2/2015 | Muth ...................... G06F 21/52 717/124 |
| 2002/0144255 | A1* | 10/2002 | Anderson .................... 717/174 |
| 2003/0028850 | A1* | 2/2003 | Quinn et al. ................. 715/530 |
| 2004/0255291 | A1* | 12/2004 | Sierer et al. .................. 717/174 |
| 2005/0022176 | A1* | 1/2005 | Ramachandran et al. ..... 717/170 |
| 2005/0086391 | A1* | 4/2005 | Chu et al. ......................... 710/1 |
| 2006/0168567 | A1* | 7/2006 | Kressin et al. ................ 717/124 |
| 2007/0169041 | A1* | 7/2007 | Kojima et al. ................ 717/148 |
| 2008/0072219 | A1* | 3/2008 | Kabadiyski ................... 717/175 |
| 2008/0120609 | A1* | 5/2008 | Gates et al. ................... 717/168 |
| 2009/0282474 | A1* | 11/2009 | Chen et al. ...................... 726/21 |
| 2009/0288079 | A1* | 11/2009 | Zuber et al. ................... 717/176 |
| 2010/0017461 | A1* | 1/2010 | Kokkevis et al. ............. 709/203 |
| 2010/0118038 | A1* | 5/2010 | Labour et al. ................ 345/522 |
| 2011/0016414 | A1* | 1/2011 | Ernst et al. ................... 715/764 |
| 2014/0089914 | A1* | 3/2014 | Kay ...................... G06F 9/45504 717/176 |
| 2014/0282494 | A1* | 9/2014 | Chor ......................... G06F 8/61 717/176 |

OTHER PUBLICATIONS

Gupta et al., Tagging requirements for web application, Feb. 2012, 10 pages.*

(Continued)

*Primary Examiner* — Thuy Dao
(74) *Attorney, Agent, or Firm* — Fish & Richardson P.C.

(57) ABSTRACT

Methods, systems, and apparatus, including computer programs encoded on a computer storage medium, for providing selective notifications. In one aspect, a method includes receiving code for a web application, the code including a reference to a native application equivalent to the web application, and determining whether to display a notification regarding the native application equivalent to the web application, then selectively displaying the notification regarding the native application equivalent to the web application based on the determination.

12 Claims, 4 Drawing Sheets

(56) References Cited

OTHER PUBLICATIONS

Le Pallec et al., A support to multi-devices web application, Oct. 2010, 2 pages.*

Mikkonen et al., Towards a uniform web application platform for desktop computers and mobile devices, Mar. 2008, 29 pages.*

Notification of Transmittal of the International Search Report and the Written Opinion of the International Searching Authority issued in PCT/US2012/054087 on Nov. 7, 2012, 10 pages.

* cited by examiner

SELECTIVE NOTIFICATION OF NATIVE APPLICATIONS

CROSS-REFERENCE TO RELATED APPLICATION

This application claims the benefit of U.S. Provisional Pat. App. No. 61/547,810, filed Oct. 17, 2011, which is incorporated herein by reference.

BACKGROUND

The present specification relates to content serving.

A content provider can generate content and serve content to users across data networks such as the Internet. The content may take different display formats based on the type of device used to render and display the content. For example, a webpage can be displayed in a desktop format on a desktop web browser, a mobile format on a mobile web browser, an RSS feed that records recent updates, and mobile applications native to mobile clients. Each display format may be configured to take advantage of display and input capabilities of a particular display device (e.g. GPS in a mobile phone, a large screen on a desktop computer), and may be designed to avoid shortcomings of display devices (e.g. a small screen on a mobile phone, lack of GPS in a desktop computer).

SUMMARY

According to one innovative aspect of the subject matter described in this specification, the code of a webpage with a native application alternative can include a reference to the native application alternative. When the code is loaded, the browser rendering the page or another system can determine whether to display a notification of the native application alternative. This displaying may take place in the browser, for example as an interactive button for the user to press. The display may also take place in a different application, for example the native application can have a search result boost the next time the user opens an application market to find new applications. According to another innovative aspect of the subject matter described in this specification, the notification can respect user and system settings, such as displaying in a way specified by the user and only if the device used is compatible with the native application alternative.

According to another innovative aspect of the subject matter described in this specification, a process includes receiving code for a web application, the code including a reference to the native application equivalent to the web application, and determining whether to display a notification regarding the native application equivalent to the web application, then selectively displaying the notification regarding the native application equivalent to the web application based on the determination.

According to another innovative aspect of the subject matter described in this specification, a process includes receiving, by a client device, code for a web application, the code including a reference to a native application equivalent to the web application, and determining, by the client device, whether to display a notification regarding installation of the native application equivalent to the web application on the client device, then selectively displaying the notification regarding installation of the native application equivalent to the web application on the client device based on the determination.

According to another innovative aspect of the subject matter described in this specification, a process includes receiving code for a web application, the code including a reference to a native application equivalent to the web application, and determining whether the native application equivalent to the web application is already installed on one or more of the computers, then displaying the notification regarding the native application equivalent to the web application based on determining that the native application equivalent to the web application is not already installed on the one or more computers.

According to another innovative aspect of the subject matter described in this specification, a process includes receiving code for a web application, the code identifying a native application that corresponds to the web application, and determining that the native application that corresponds to the web application is already installed on one or more of the computers, then blocking a notification to install the native application that corresponds to the web application.

Other embodiments of these aspects include corresponding methods, systems, apparatus, and computer programs, configured to perform the actions of the methods, encoded on computer storage devices.

These and other implementations may each optionally include one or more of the following features. For instance, the reference to the native application equivalent to the web application is included in a META tag in a header of the code; the process includes rendering the web application, where selectively displaying the notification includes displaying the notification in the rendered web application; determining whether to display a notification includes determining whether the native application is already installed on a device; determining whether to display a notification includes determining whether the native application is available; determining whether to display a notification includes determining whether the native application is permitted to be installed; determining whether to display a notification includes determining whether notifications are enabled; and/or determining whether to display a notification includes determining whether the native application is compatible with a device that receives the code for the web application;

In some implementations, the determination is made by a mobile device that receives the code for the web application; determining whether to display a notification includes transmitting, to one or more servers and by a mobile device that receives the code for the web application, a request to make the determination, and receiving, from the one or more servers and by the mobile device, a result of making the determination; the process includes determining a time when the notification is to be displayed; wherein the notification is displayed at the determined time; selectively displaying the notification includes displaying an application recommendation regarding the native application; selectively displaying the notification includes not displaying the notification when the determination is made to not display the notification; the process includes validating the reference to the native application equivalent to the web application; and/or validating the reference includes determining that an address associated with the reference matches an address of a web server from which the code for the code was received.

Advantageous implementations may include one or more of the following features. Webpages with native application alternatives may restrict notification of the native application alternative to users that wish to receive them and to devices that are able to install them. User searching for native applications can be refined based on past web browsing. Native application notifications can be restricted to only be displayed on the websites of the publisher of the native application.

Verifying the native application can prevent notifications of malicious or unwanted native applications.

The details of one or more implementations are set forth in the accompanying drawings and the description below. Other potential features and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
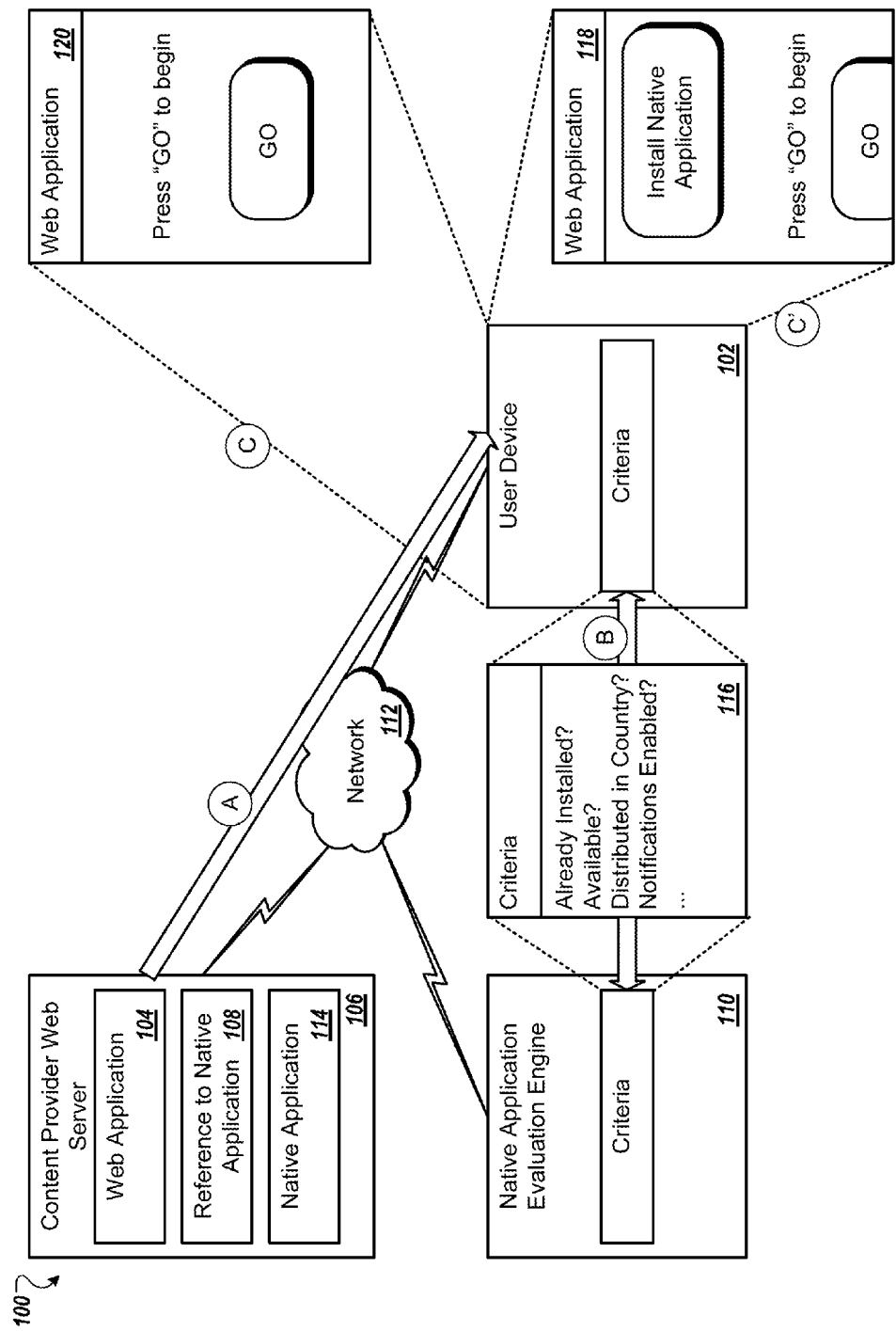
FIG. 1 is a diagram of an example system that displays a web application that has a corresponding native application equivalent.

FIG. 1 is a diagram of an example system 100 that displays a web application that has a corresponding native application equivalent. In the system 100, a user is using a user device 102 to browse the Internet, and requests a web application 104 on a content provider web server 106. The content provider web server 106 can serve the web application 104 with a reference to a native application 108. The user device 102, optionally with a native application evaluation engine 110, can render the web application 104 and the reference to the native application 108.

The user device 102, the content provider web server 106, and the native application evaluation engine 110 can be implemented, for example, as computing devices 400 and/or mobile computing devices 450 described with reference to FIG. 4 below. In this example, the content provider web server 106 and the native application evaluation engine 110 will be described as separate web servers under different administrative domains, and the user device 102 will be described as a mobile phone. However, other configurations are possible. For example, the content provider web server 106 and the native application evaluation engine 110 may be incorporated in the same computer device, and the user device 102 could be a desktop computer. The user device 102, the content provider web server 106, and the native application evaluation engine 110 are all connected to a network 112 (e.g. the Internet) for communication with each other and other computer systems.

The content provider web server 106 is a public facing web server that, among other features, can receive request the web application 104 and respond with messages containing the code of the web application 104 and, optionally, the reference to the native application 108. The reference to the native application 108 identifies a native application 114 that may be stored by and served from the content provider web server 106 or another computer system. The native application 114 and the web application 104 may both provide the same content to users in different formats.

For example, a web application 104 may be an HTML web page with embedded scripting to provide a user with an editable spreadsheet. The native application 114 may be an application configured to run on a user device that provides a user with the same editable spreadsheet, optionally with different input or output format based on the capacities of the user device. In many, but not all, cases, the web application 104 is software that is downloaded, in whole or part, each time that it is run, and that is hosted within a browser-controlled environment, or coded in a browser-supported language. Used here, the web application 104 is not limited to interactive or editable digital assets. Web applications 104 also include, for example, substantially static web pages (e.g. a news website, discussion forum) as well as more interactive assets (e.g. chat/messaging websites, hosted applications). The native application 114 can include software that is stored and run on a device's operating system and machine firmware, or on an environment hosted on the device's operating system and machine firmware (e.g. a virtual machine or a managed runtime environment). A native application equivalent includes a native application that implements the same functionality as is implemented by the web application Continuing with the example of a user editable spreadsheet, when the content provider web server 106 receives a request for the web application 104, the content provider web server 106 can reply with the web application 104 (a webpage with a user editable spreadsheet) or with the web application 104 and the reference to the native application 108. The reference to the native application 108 included in the reply can take a variety of forms, such as being included in a META tag in a header of the code of the reply.

In some implementations, the content provider web server 106 may decide to or not to include the reference to the native application 108 depending on factors such as, for example, the type of user device 102 making the request. This information may be available to the content provider web server 106 based on the user-agent field of the request for the web application 104. Another factor that may be used by the content provider web server 106 is to verify that the requesting user is a "subscribing" or "premium member" that is authorized to use the native application 114.

The user device 102 is an electronic device for displaying content to one or more uses. As previously described, the user device 102 is this example is a mobile phone, but other user devices are possible, including e-book readers, televisions, navigation devices and laptop, tablet, or desktop computers. The user device 102 includes a web browser to request, receive, and display remote content, including the web application 104.

The user device 102 can request the web application 104 and may receive the reference to the native application 108 with the response that includes the code for the web application 104. The user device 102 can determine how to handle the reference to the native application 108 according to a set of criteria 116. The criteria can include logical determinations including, but not limited to, tests such as:

"Is the native application 114 already installed?"
"Is the native application 114 available on the platform of the user device 102?"
"Is the native application 114 distributed in the country in which the user device is registered?"
"Has the user enabled notifications?"

In some implementations, the criteria 116 is stored locally on the user device 102, and optionally backed up to a server or another computer device owned by the user of the user device 102. Additionally, the criteria 116 can be stored in the native application evaluation engine 110. The native application evaluation engine 110 can coordinate all of the criteria 116 associated with a particular user across all of the user's user device 102. That is, a user may have a mobile phone and a desktop computer registered with the native application evaluation engine 110. The native application evaluation engine 110 can store the criteria 116 for both the mobile phone and desktop computer. Some of the criteria 116 may apply to both devices (e.g. "Has the user enabled notifications?") and some of the criteria 116 may only apply to one or the other device (e.g. "Is the native application 114 already installed?")

Upon receipt of the reference to the native application 108, the user device 102 or the native application evaluation engine 110 can validate the reference to the native application 108. This validation process can ensure, for example, that the web application 104 and the native application 114 are both from the same content provider or that the native application 114 is not blacklisted (e.g. by an anti-virus application). In some implementations, validating the reference to the native application 108 includes determining that an address associated with the reference to the native application 108 matches an address of the content provider web server 106.

For example, the native application 114 can be published under a naming convention that specifies the name space of the application as com.{publisher}.{application}.{version}. In this example, {publisher}, {application} and {version} are variables for the publisher, application name, and version number of the native application. The user device 102 can check that the {publisher} value matches the domain name of the uniform resource locator (URL) of the content provider web server 106. If the {publisher} and domain name do not match, the user device 102 may be configured to ignore the reference to the native application. Examples of cases where the {publisher} and domain name do not match include a content provider web server 106 that has been compromised by a malicious program that provides a reference to the native application that is not related to the web application 104, or a content provider web server 106 that deceptively provides references to native applications published by a third party.

Based on the criteria 116, the user device can optionally display the web application with a notification 118 or the web application without a notification 120. In the example shown, the notification is embedded in the web application as a user-activatable button. However, other formats of notifications are possible, including notifications displayed at later times and/or in other applications.

The web application may specify a display location and format of the notification. In this case, the author of the web application may wish to place the notification in an area that is problematic to view or interact with on some types of user devices. The operating system or web browser of the user device 102 may handle the reference outside of the web application being rendered. For example, the web browser may list any notification in the chrome of the browser, or the operating system may add the notification to a universal notification user interface that also displays notification such as new emails, calendar appointments, etc. The user device 102 and/or the native application evaluation engine 110 may record the notification for use later or in another software system. For example, the next time the user is in an application market—an application that displays applications for purchase or free installation—the native application 114 can be displayed as a suggested application or be assigned a search rank boost. In some implementations, the user may set a preference to have the user device 102 automatically download and transition to the native application 114 upon receipt of the reference to the native application 108, without any additional user input.

Figure 2:
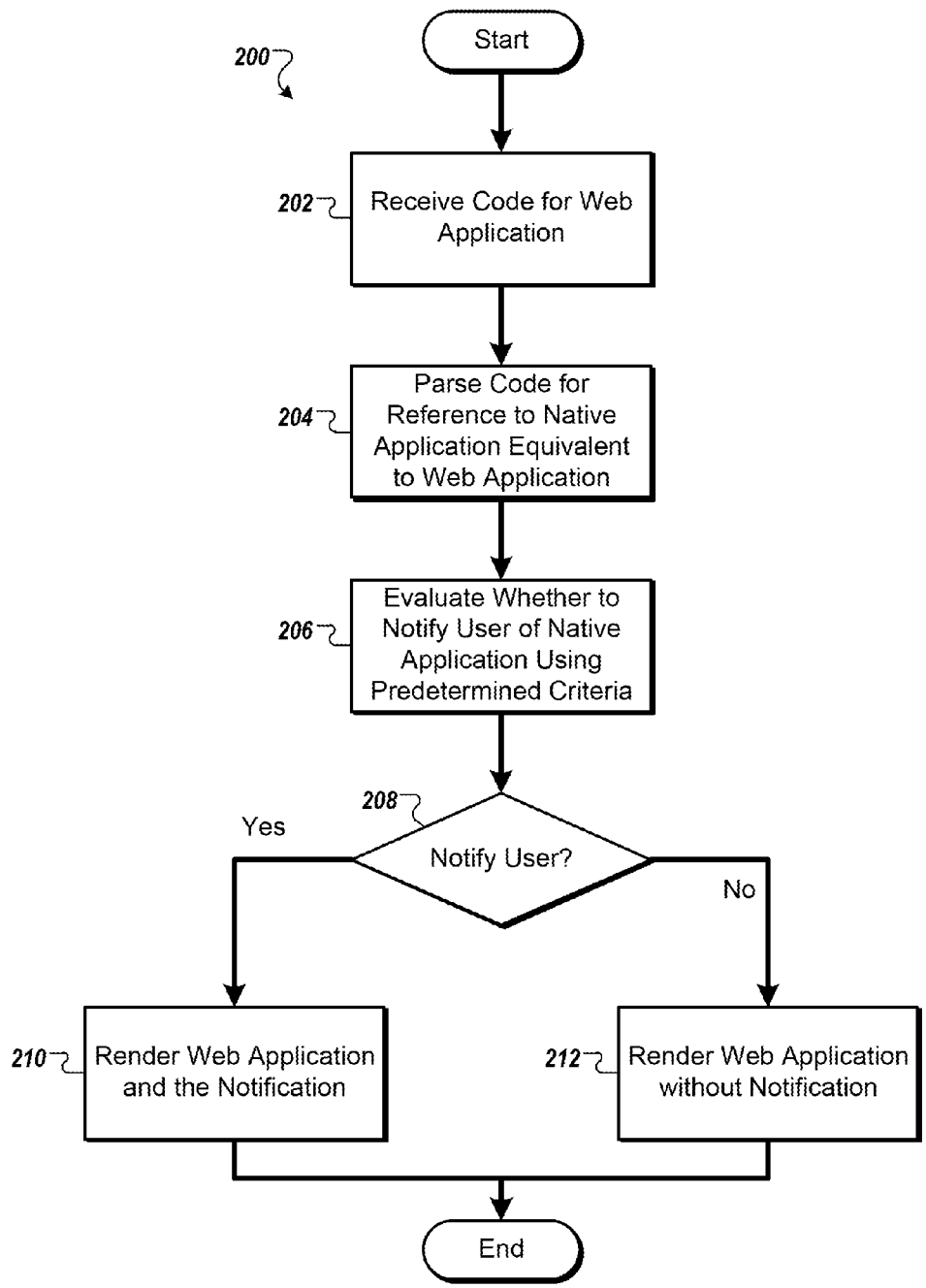
FIG. 2 is a flow chart illustrating an example process for notifying a user about a native application equivalent.

FIG. 2 is a flow chart illustrating an example process 200 for notifying a user about a native application equivalent. Briefly, the process 200 includes receiving a notification of a native application, and determining if a user should be alerted to the notification. The process 200 may be performed by, for example, the user device 102 and the native application evaluation engine 110 of the systems 100, but another system, or combination of systems, may also perform the process 200. While a particular number, type, and order of actions are described here, other numbers, orders, and types of actions may be possible within the process 200.

Code for a web application is received (202). The code includes a reference to the native application equivalent to the web application. For example, a web browser the user device 102 may send an HTTP GET message to the content provider web server 106 requesting the web application 104. The content provider web server 106 may respond with a HTTP response that includes the code of the web application 104 and, within the code of the web application 104, a reference to the native application 108. The reference to the native application 108 may include, for example, the URL or package name of the native application 114 that is a native application equivalent of the web application 104.

Code for the reference to the native application equivalent to the web application is parsed (204). For example, the web browser of the user device 102 can parse the HTTP response and identify, among other information, the reference to the native application 108. An evaluation of whether to notify the user about the native application is made using predefined criteria (206). In some implementation, this evaluation can include determining whether to display a notification regarding the native application equivalent to the web application. For example, the user device 102 and/or the native application evaluation engine 110 can compare the criteria 116 to the state of the user device 102, metadata of the reference to the native application 108, or other input to determine if the notification should be displayed to the user.

A list of possible criteria 116 test option is provided below, but other test options are possible. In some implementations, the user device 102 and/or the native application evaluation engine 110 can be configured to use multiple test options for the same notification, or different test options for different classes of notifications.

The criteria 116 can include determining whether the native application is already installed on a device. For example, the user device 102 or the native application evaluation engine 110 may access a list of native application already installed on the user device 102 and reject any matching an entry in that list.

The criteria 116 can include determining whether the native application is available. For example, the reference to the native application 108 may refer to an application that has been discontinued or the reference to the native application 108 may be malformed and not point to any native application 114.

The criteria 116 can include determining whether the native application is permitted to be installed. For example, the native application 114 may be restricted by user location (e.g. only in some countries) or only to users that have paid for a service or for the native application 114.

The criteria 116 can include determining whether notifications are enabled. For example, the user of the user device 102 may have previously set a system level preference to not receive any native application notifications, or only native application notification of a particular class (e.g. only free application).

The criteria 116 can include determining whether the native application is compatible with a device that receives the code for the web application. For example, the user device 102 may not meet the hardware and/or software requirements of the native application 114 or may have some required security features disabled.

The user device 102 may be configured to perform the evaluation, the native application evaluation engine 110 may be configured to perform the evaluation, or the two may be configured to interact to perform the evaluation. In some implementations, the browser or operating system of the user device 102 can perform this evaluation substantially 'in-line' with rendering the web application 104. That is, the evaluation may be made locally by the user device 102 without any additional communication to another computer system. In some other implementations, the user device 102 can transmit, to the native application evaluation engine 110 and/or other systems, a request to make the evaluation. This request can include addition information, such as a user identifier, the state of the user device 102, etc. The native application evaluation engine 110 and/or the other systems can receive, process, and reply to this request with an indication to display or not display the notification. In still some other implementations, the user device may perform a first evaluation based on limited criteria 116 (e.g. the state of the user device 102) and the native application evaluation engine 110 can perform a second evaluation based on different criteria 116 (e.g. user preferences that apply to all devices used by the user)

Based on the evaluation, a type of notification display can be selected (208). If the evaluation is to not display the notification, then no notification display may need be selected. If the evaluation is to display the notification, one or more styles of display may be selected. Example notification displays include, but are not limited to, logging the notification for use by a different application, displaying the notification as part of the web application 104, displaying the notification by the application displaying the web 104, or displaying the notification with an operating system feature.

If the notification is to be displayed, the web application is rendered with the notification (210). This notification may be displayed at the same time as the web application 104, or the user device 102 and/or the native application evaluation engine 110 may determine a time when the notification is to be displayed. Later, the user device 102 or another device associated with the user, either by way of the operating system, the browser rendering the web application 104, or another application can display the notification to the user.

If the notification is not to be displayed, the web application is rendered without the notification (212). In some implementations, the web application 104 rendered without the notification may appear to the use substantially identical to the web application 104 if no reference to the native application 108 was provided to the user device 102.

Figure 3:
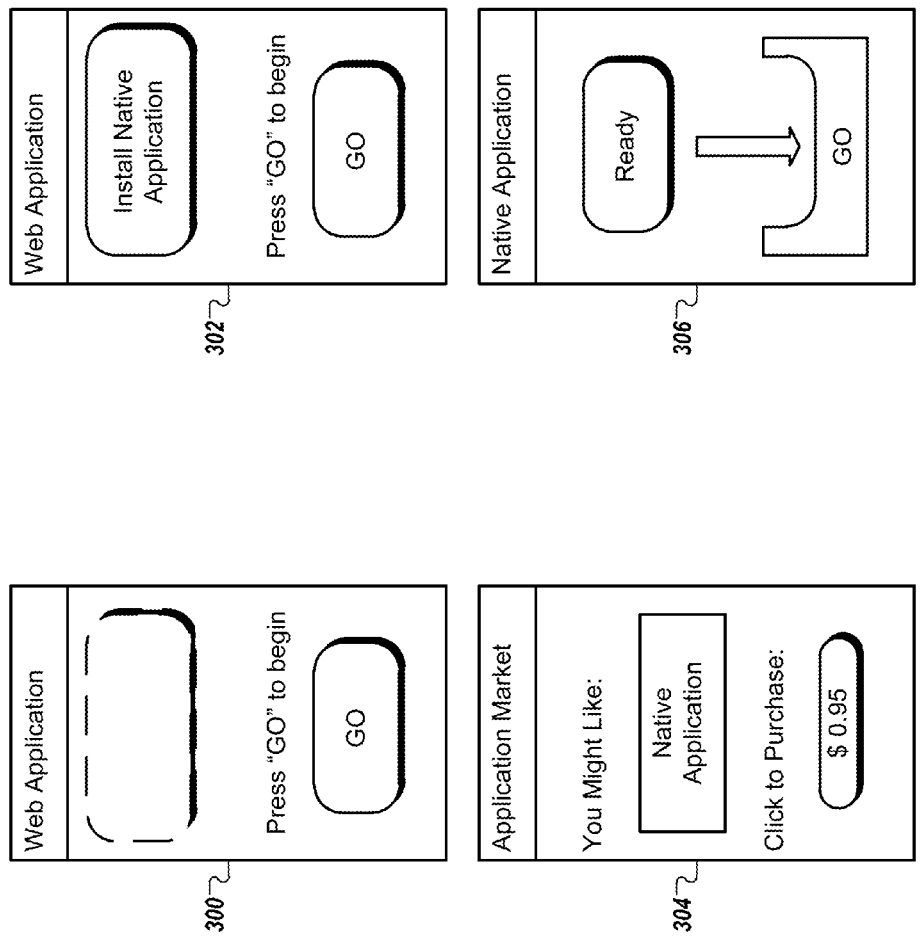
FIG. 3 is a diagram of example users interfaces for replacing a web application with a native application.

FIG. 3 is a diagram of example users interfaces for replacing a web application with a native application. The user interfaces illustrates a sequence of screens of a mobile phone where a user is notified of a native application alternative to a web application, and where the user chooses to use the native application instead of the web application.

Interface 300 shows an example web application that begins with a "GO" button and instructions to press the "GO" button for some action to start. The exact nature of the web application is unimportant for this example, except to note the "GO" button to start some of functionality. A placeholder location is specified by the web application for a notification to be placed by the web browser rendering the web application. In practice, this placeholder location need not be actually shown to the user and may be defined by non-rendering metadata in the Interface 300. The placeholder location may also define the look-and-feel and functionality of the notification, if it is to be displayed to the user.

Interface 302 shows the example web application with the notification displayed to the user. Between the interface 300 and 302, the user device or another system has determined that the notification should be shown to the user. For example, the user may have specified in a setting screen that the user wishes to see this type of notification. In this example, the notification takes the form of a user-activatable button in the web application. If the user activates the button, the user is transitioned to an application market at an entry for the native application that is an equivalent to the web application.

Interface 304 shows the application market opened to the native application equivalent. The application market is a program that allows the user to browse available native applications available on the user device. In some other implementations, instead of being directed to an application market, the user may be directed to a webpage managed by the native application publisher that permits the user to download the native application. The user may press the purchase button on the application market screen to purchase, download, and install the native application. For native application provided free or without cost, the purchase button may be replaced by a download or install button.

Interface 306 shows the native application equivalent to the web application. The native application is configured specifically for a touch-pad enabled user device and consists of a user-draggable interface element "Ready". Dragging the "Ready" element to the "GO" dock initiates substantially the same action in the native application as pressing the "GO" button in the web application.

In some implementations, the transition from the interface 302 to the interface 304 and then to the interface 306 can maintain information from the interface 302. For example, if a user is logged into the web application in the interface 302 or has data already generated, this information can be retained and loaded into the native application in the interface 306.

Figure 4:
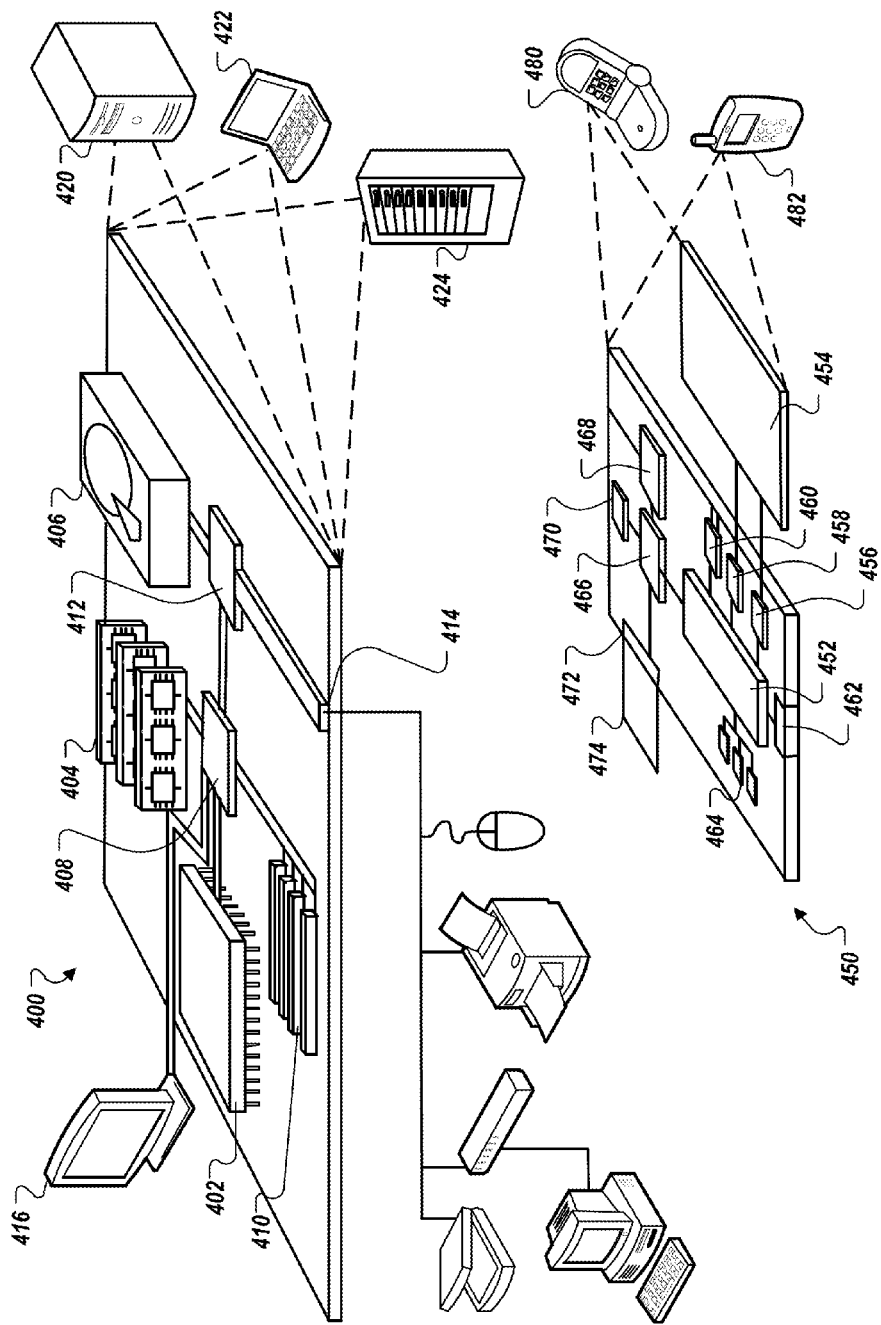
FIG. 4 is a schematic diagram that shows an example of a computing system that may be used in connection with computer-implemented methods and systems described in this document.

FIG. 4 shows an example of a computing device 400 and a mobile computing device that can be used to implement the techniques described here. The computing device 400 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The computer program product can also be tangibly embodied in a computer- or machine-readable medium, such as the memory 404, the storage device 406, or memory on the processor 402.

The high-speed interface 408 manages bandwidth-intensive operations for the computing device 400, while the low-speed interface 412 manages lower bandwidth-intensive operations. Such allocation of functions is exemplary only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a microdrive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provide as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 464, the expansion memory 474, or memory on the processor 452. In some implementations, the computer program product can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

What is claimed is:

1. A computer-implemented method comprising:
   receiving, by a client device, code for invoking a web application within a browser environment, the code including a reference to a native application that (i) operates outside of the browser environment, (ii) is not installed on the client device, and (iii) is an alternative to the web application;
   determining, by the client device and based on one or more pre-determined criteria, that the native application is not to be installed on the client device, wherein determining based on one or more pre-determined criteria that the native application is not to be installed comprises determining that native application installation notifications are disabled; and
   in response to determining that the native application is not to be installed on the client device, determining to bypass installation of the native application on the client device.

2. The method of claim 1, wherein determining based on one or more pre-determined criteria that the native application is not to be installed comprises determining that the native application is not permitted to be installed.

3. The method of claim 1, wherein determining based on one or more pre-determined criteria that the native application is not to be installed comprises:
   transmitting, to one or more servers and by the client device, a request to make the determination, and
   receiving, from the one or more servers and by the mobile device, a result of making the determination.

4. The method of claim 1, comprising validating the reference to the native application.

5. The method of claim 1, wherein determining based on one or more pre-determined criteria that the native application is not to be installed comprises:
   identifying an application type for the native application; and
   determining that applications of the identified application type are not to be installed on the client device.

6. The method of claim 5, wherein determining that applications of the identified application type are not to be installed on the client device comprises identifying a user preference that indicates that applications of the identified application type are not to be installed on the client device.

7. A computer-implemented method comprising:
   receiving, by a client device, code for invoking a web application within a browser environment, the code including a reference to a native application that (i) operates outside of the browser environment, (ii) is not installed on the client device, and (iii) is an alternative to the web application;

determining, by the client device and based on determining that the native application is not compatible with the client device, that the native application is not to be installed on the client device; and in response to determining that the native application is not to be installed on the client device, determining to bypass installation of the native application on the client device;

wherein the reference to the native application is included in a META tag in a header of the code.

8. A computer-implemented method comprising:

receiving, by a client device, code for invoking a web application within a browser environment, the code including a reference to a native application that (i) operates outside of the browser environment, (ii) is not installed on the client device, and (iii) is an alternative to the web application;

determining, by the client device and based on one or more pre-determined criteria, that the native application is not to be installed on the client device;

in response to determining that the native application is not to be installed on the client device, determining to bypass outputting an alert regarding installation of the native application on the client device; and validating the reference to the native application, wherein validating the reference comprises determining that an address associated with the reference matches an address of a web server from which the code for invoking the web application was received.

9. A system comprising:

one or more computers and one or more storage devices storing instructions that are operable, when executed by the one or more computers, to cause the one or more computers to perform operations comprising:

receiving code for invoking a web application within a browser environment, the code including a reference to a native application that (i) operates outside of the browser environment, (ii) is not installed on the one or more computers, and (iii) is an alternative to the web application;

determining, based on one or more pre-determined criteria, that the native application is not to be installed on the one or more of the computers, wherein determining based on one or more pre-determined criteria that the native application is not to be installed comprises determining that native application installation notifications are disabled; and in response to determining that the native application is not to be installed on the one or more computers, determining to bypass installation of the native application on the one or more of the computers.

10. The system of claim 9, the operations further comprising validating the reference to the native application.

11. A system comprising:

one or more computers and one or more storage devices storing instructions that are operable, when executed by the one or more computers, to cause the one or more computers to perform operations comprising:

receiving code for invoking a web application within a browser environment, the code including a reference to a native application that (i) operates outside of the browser environment, (ii) is not installed on the one or more computers, and (iii) is an alternative to the web application;

determining, based on one or more pre-determined criteria, that the native application is not to be installed on the one or more of the computers; and in response to determining that the native application is not to be installed on the one or more computers, determining to bypass installation of the native application on the one or more of the computers; and validating the reference to the native application, wherein validating the reference comprises determining that an address associated with the reference matches an address of a web server from which the code for invoking the web application was received.

12. A non-transitory computer-readable medium storing software comprising instructions executable by one or more computers which, upon such execution, cause the one or more computers to perform operations comprising:

receiving, by the one or more computers, code for invoking a web application within a browser environment, the code including a reference to a native application that (i) operations outside of the browser environment, (ii) is not installed on the one or more computers, and (iii) is an alternative to the web application;

determining, based on one or more pre-determined criteria, that the native application is not to be installed on the one or more of the computers, wherein determining based on one or more pre-determined criteria that the native application is not to be installed comprises determining that native application installation notifications are disabled; and in response to determining that the native application is not to be installed on the one or more of the computers, determining to bypass installation of the native application that corresponds to the web application on the one or more computers.

* * * * *